United States Patent [19]
Law

[11] Patent Number: 5,708,314
[45] Date of Patent: Jan. 13, 1998

[54] MULTI-ROTOR A.C. ELECTRIC DRIVE DEVICE

[76] Inventor: Mingyuen Law, E-604, N.T. Hong Kong, Hong Kong

[21] Appl. No.: 535,166

[22] PCT Filed: Apr. 5, 1994

[86] PCT No.: PCT/CN94/00022

§ 371 Date: Oct. 23, 1995

§ 102(e) Date: Oct. 23, 1995

[87] PCT Pub. No.: WO94/26016

PCT Pub. Date: Nov. 10, 1994

[30] Foreign Application Priority Data

Apr. 27, 1993 [CN] China ............... 93105463.X

[51] Int. Cl.⁶ .................. H02K 16/00; H02K 16/02
[52] U.S. Cl. .................. 310/114; 310/103; 310/78; 310/92; 310/118; 310/166
[58] Field of Search .................. 310/114, 78, 92, 310/118, 166, 126, 103

[56] References Cited

U.S. PATENT DOCUMENTS

| | | | |
|---|---|---|---|
| 2,860,296 | 11/1958 | Mollenberg | 318/221 |
| 2,864,017 | 12/1958 | Waltsheff | 310/126 |
| 3,609,426 | 9/1971 | Gaul | 310/112 |
| 3,904,901 | 9/1975 | Renard et al. | 310/52 |
| 3,973,137 | 8/1976 | Drobina | 310/114 |
| 4,485,310 | 11/1984 | Da Valroger | 290/52 |
| 4,488,069 | 12/1984 | Field, II | 310/49 A |
| 4,625,160 | 11/1986 | Hucker | 322/22 |
| 4,803,390 | 2/1989 | Bertram et al. | 310/50 |
| 5,053,664 | 10/1991 | Kikuta et al. | 310/114 |
| 5,144,178 | 9/1992 | Sugiura | 310/114 |

FOREIGN PATENT DOCUMENTS

| | | | |
|---|---|---|---|
| 88102119 | 12/1988 | China | 310/114 |
| 1063183 | 7/1992 | China | 310/114 |
| A875546 | 10/1981 | Russian Federation | 310/114 |

OTHER PUBLICATIONS

D. E. Sims, "Two Pole-Four Pole Motor", IBM Technical Disclosure Bulletin, vol. 14, No. 3, Aug. 1971.

Primary Examiner—Clayton E. LaBalle
Assistant Examiner—Elvin G. Enad
Attorney, Agent, or Firm—Renner, Otto, Boisselle & Sklar, P.L.L.

[57] ABSTRACT

A multi-rotor A.C. electric drive device comprises a stator capable of producing a rotating or an alternating magnetic field and at least two rotors capable of producing an electromagenetic torque at asynchronous speed. The rotors are respectively called the main rotor and the auxiliary rotor. In low speed operating mode of said device, the electromagnetic torque of the auxiliary rotor is amplified through a transmission portion and drives an output element together with the main rotor; after the auxiliary rotor is accelerated to the synchronous speed, an automatic unloading device releases the auxiliary rotor from the driving engagement with the output element. Examples illustrating several types of electromagnetic portion, transmission portion and the automatic unloading device are given.

5 Claims, 8 Drawing Sheets

MULTI-ROTOR A.C. ELECTRIC DRIVE DEVICE

TECHNICAL FIELD OF THE INVENTION

This invention concerns to a kind of A.C. electric drive device, including A.C. motors and the drive portions of machines using A.C. power. Said electric drive device includes a stator, a rotor and a transmission element called as the output element and used for driving the mechanical load. Said stator has a core for conducting magnetic flux, and a winding capable of generating a rotating or an alternating magnetic field when a suitable AC power is supplied. Said rotor, being in the rotating or alternating magnetic field, is capable of producing a torque at asynchronous speed. Said rotor drives the output element directly or through a transmission system with a fixed speed ratio.

The so-called "rotor capable of producing a torque at asynchronous speed" includes the "induction rotors" which can produce driving torque mainly depending on the electromagnetic effect of its induced current; the hysteresis rotor which can produce a torque mainly depending on the effect of magnetic hysteresis of its core material; and offer similar rotors, such as the rotors that have an integral steel core. While rotating under asynchronous speed in a rotational or an alternating magnetic field, the later type of rotor can produce a torque not only due to the electromagnetic effect of the induced eddy current but also due to the hysteresis effect of the steel material.

TECHNICAL BACKGROUND

Among existing electric drive devices used for driving the working machines, A.C. motors are the most commonly applied; among existing A.C. motors, the asynchronous motor, especially the type of "squirrel-cage" is the most extensively used. The asynchronous motors are simple in structure, reliable in operation, long in service life, low in cost, but small in starting torque and large in starting current, not large enough in overload capacity and has a rigid mechanical characteristic. This type of motors can normally be operated only in a narrow speed region. Therefore, conventional asynchronous motors and similar electric drive devices are not suitable for driving such machinery that must be working with a larger starting load, or of which the speed must be variable according to the load in a wider range.

These disadvantages of the asynchronous motor can be improved by increasing the resistance of its rotor winding. Having adopted this method it is able to limit the starting current and increase the starting torque to a certain degree, as well as soften its characteristics, but this method cannot increase the maximum torque and will significantly decrease the rated efficiency of the motor. Therefore, whenever the characteristics of the asynchronous motor and similar electric drive device cannot meet user's requirements, the more complicated motors, such as brush motors etc., will have to be used, even though these motors are either more expensive or shorter in service life and poorer in operating reliability.

DISCLOSURE OF THE INVENTION

In order to overcome the disadvantages of asynchronous motors and the similar electric drive devices, the purpose of this invention is to provide an A.C. electric drive device used as a prime driving unit or driving portion in some machines, which is reliable in operation, greater in starting torque and overload capacity, but not very complicated in structure and may drive the mechanical load effectively in a wider operation range.

In order to achieve this purpose, the electric drive device provided by this invention includes an electromagnetic portion and a transmission portion. Said electromagnetic portion includes a stator which can generate a rotating or an alternating magnetic field and, at least, two rotors capable of producing the driving torque under asynchronous speed. One of said rotors is called as the "main rotor", the other one the "auxiliary rotor". Said transmission portion has several transmission elements with fixed speed ratios between each other, including a transmission element which is called as the "output element" and used for driving the mechanical load. Each of said rotors is connected with one of said transmission elements and thus can drive the output element with different fixed speed ratios respectively. The speed ratio of said main rotor to the output element is less than that of any auxiliary rotor to the same. The "speed ratio of a rotor to the output element" mentioned here and below means the ratio of the speed of said rotor to the speed of said output element unless otherwise specified.

After said electric drive device is actuated, whenever the speeds of said rotors are lower than the synchronous speed, all of the said rotors are in the "motor state" and are driving the output element simultaneously. With said electric drive device speeding up, due to the speed ratios of the auxiliary rotors greater than that of the main rotor, the speed of the auxiliary rotors will reach the synchronous speed one after another prior to the main rotor and then enter into their "generator state" producing the reversing moment, such that the output torque of said electric drive device will be decreased. Sometimes, this influence will only cause a slight torque loss; but in many cases, it cannot be ignored. In order to avoid said influence exerted by the auxiliary rotors, an automatic unloading device may be equipped in said electric drive device. Once a auxiliary rotor speeded up to a certain speed near or equal to the synchronous speed, the automatic unloading device will free the auxiliary rotor from driving the output element by means of that, for instance, disconnecting the transmission engagement between said auxiliary rotor and the output element, so that the auxiliary rotor can float freely; or making said auxiliary rotor disable to produce electromagnetic moment any further.

As mentioned above, said electric drive device in its low speed condition, i.e. prior to every one of said auxiliary rotors has been speeded up to the synchronous speed, the output element is driven by several rotors simultaneously. At this time, the output torque of said electric drive device is the sum of the electromagnetic torques produced by said rotors and amplified according to different speed ratios thereof, wherein including the components produced by the auxiliary rotors and amplified by the transmission portion. Thus, the starting torque and overload capacity of said electric drive device of this invention may be greater than those of the existing conventional asynchronous motors as well as similar electric drive devices thereof.

Generally, as compared with the existing conventional asynchronous motors, the electric drive device of this invention can, in its lower speed condition, output active power more effectively due to having the auxiliary rotor of which the speed is higher and the slip is less than that of the main rotor. Therefore, said electric drive device has a higher efficiency in low speed condition and is capable of driving the mechanical load more effectively within a wider speed range.

Particularly, if the auxiliary rotor of the electric drive device of this invention is made to have an appropriate copper or core loss, in other words, an additional resistance of the rotor winding can be added to the equivalent electric circuit of said electric drive device. This will limit the staffing current of said electric drive device more satisfactorily and further increase its starting torque.

Moreover, because the number of the structural factors of the electric drive device of this invention influencing on its characteristics is much more than that of the conventional asynchronous motor, e.g. the electromagnetic relations between rotors and the stator, the types of the structure and the dimensional proportions of various rotors, the various speed ratios of rotors to the output element and whether it is equipped with an automatic unloading device, etc. Therefore, many types of the electric drive devices with different characteristics can be developed by utilizing this invention to meet the requirements of various purposes.

BRIEF DESCRIPTION OF THE DRAWINGS

To describe in further details this invention, the illustrations in combination with the attached drawings are given below.

PREFERRED EMBODIMENTS OF THIS INVENTION

Figure 1:
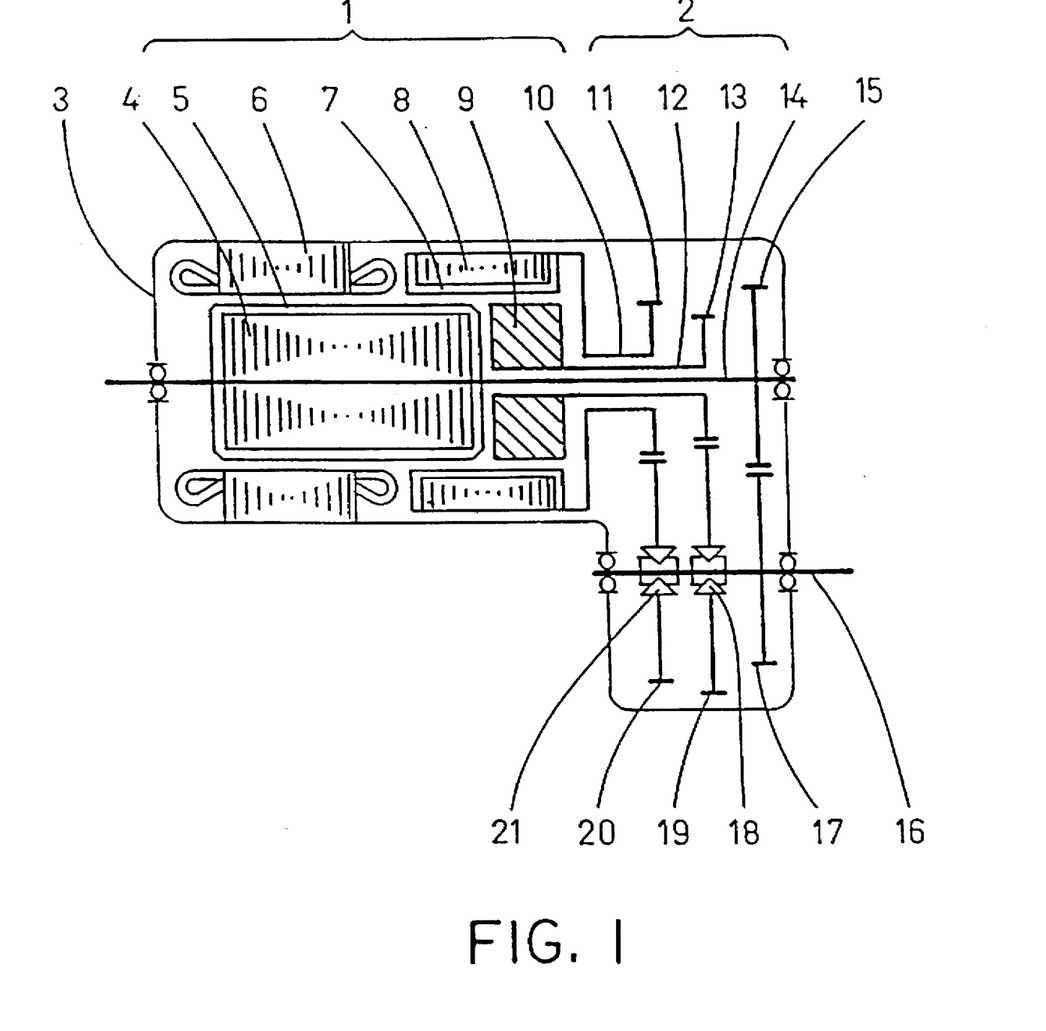
FIG. 1 is an axial sectional schematic diagram of an electric drive device of this invention, having two auxiliary rotors.

As shown in FIG. 1, a type of electric drive device of this invention includes an electromagnetic portion 1 and a transmission portion 2.

Said electromagnetic portion includes a stator 6 capable of producing a rotating or an alternating magnetic field and fixed on the frame 3; three rotors capable of producing driving torque when running at asynchronous speed, respectively being the main rotor 4, the first auxiliary rotor 8, and the second auxiliary rotor 9. Said stator and every rotor respectively have their own cores. Rotor 4 and 8 respectively have their own closed winding 5 and closed winding 7, or each has a conductor equivalent to a closed winding, for conducting the induced rotor current. Different parts of the rotor 4 are respectively surrounded by a part of the stator 6 and a part of the rotor 8; the rotor 9 is surrounded by the other part of the rotor 8; the core of said rotor 8 and the rotor 9 are neither surrounded by, nor surrounding any portion of the core of the stator 6; thus, said electromagnetic portion has three closed magnetic circuits for conducting the main magnetic fluxes. The first magnetic circuit includes the stator core and a part of the core of the rotor 4, linking with the winding 5; the second magnetic circuit includes a part of the core of the rotor 8 and the other part of the core 4, linking with windings 5 and 7; the third magnetic circuit includes the core of the rotor 9 and the other part of the core of the rotor 8, linking with the rotor winding 7.

Said transmission portion includes transmission shafts 10,12,14; the shaft 16 being an output element; gears 11,13,15,17,19 and 20; the one-way clutches 18 and 21 being the automatic unloading devices. Shafts 10 and 12 are hollow shafts. The shaft 12 is rotatably mounted on the shaft 14. The shaft 10 is rotatably mounted on shaft 12. Gears 11,13,15 and 17 are respectively connected with shafts 10,12,14 and 16. Gears 19, and 20 are respectively connected with the shaft 16 by the one-way clutches 18 and 21. Gears 11, 13 and 15 are respectively meshing with gears 20,19 and 17.

As the main rotor, the rotor 4 is connected with the shaft 14, while as the auxiliary rotors, the rotors 8 and 9 are respectively connected with the transmission shafts 10 and 12. When rotor 8 and 9 drive the shaft 16 in the positive driving direction same as that of the rotor 4, the one-way clutches 18 and 21 are coupled. Conversely, if rotors 8 and 9 are respectively fixed and the shaft 16 is driven by the rotor 4 in its predetermined positive direction, the one-way clutches 18 and 21 will respectively be released. The speed ratios of the rotors for driving the shaft 16 are sequenced as follows: that of the auxiliary rotor 9 is the largest, the auxiliary rotor 8 the lesser and the main rotor 4 the minimum.

After a suitable A.C. power is supplied to said electric drive device, in the above said first magnetic circuit a rotating or an alternating magnetic field will be generated by the stator 6. This magnetic field induces an electric current in the winding 5 and causes the rotor 4 to produce a torque; the induced current in the winding 5, in turn, will also induce a magnetic field in the above said second magnetic circuit including the core of the rotor 8 and induces a current in the winding 7. Thus a torque will also be produced by the rotor 8. The induced current in the winding 7 will induce a magnetic field in the above said third magnetic circuit including the core of the rotor 9, and causes the rotor 9 to generate drive torque too. Therefore, said three rotors will simultaneously drive the transmission shaft 16 to rotate. While said electric drive device is speeding up, the auxiliary rotors 8 and 9 will be accelerated until their speed are near or equal to the synchronous speed in accordance to the sequence of their respective speed ratio to the shaft 16. If the shaft 16 is still speeded up by the main rotor 4, its speed will consecutively exceed the speed of gears 19 and 20, thus the one-way clutches 18 and 21 will be consecutively released. Then, rotors 9 and 8 will consecutively change into their floating state.

The shaft 14 of said electric drive device may also be used as an output element. Generally, the transmission element connected with the main rotor may be used as an output element of the device of this invention, if, correspondingly, the speed ratios of the auxiliary rotors driving the output element through the transmission portion are greater than 1 (one).

Although the quantity of said auxiliary rotors in the electromagnetic portion of the electric drive device provided in this invention may 1 (one) at least, but its structure can be of various types.

Figure 2:
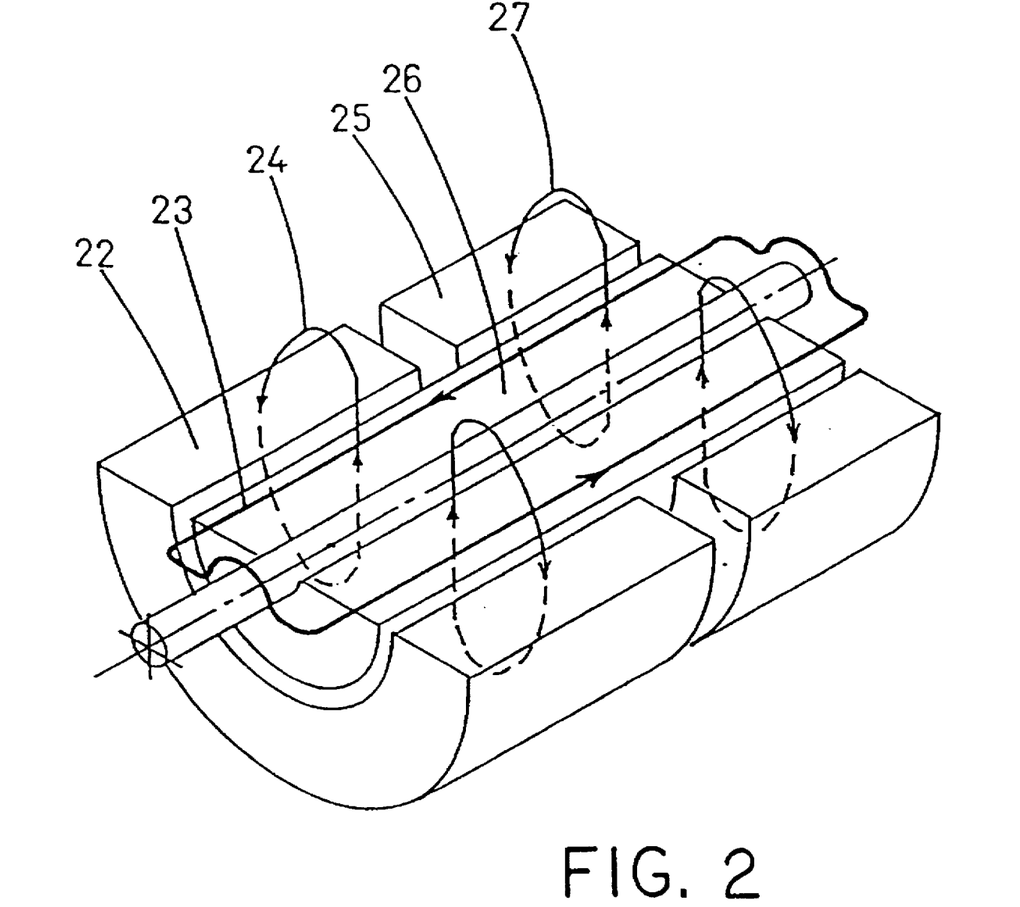
FIGS. 2 and 3 are three-dimensional cutaway view schematic diagrams of two types of the electromagnetic portions in the electric drive device of this invention.

As shown in FIG. 2, a type of the electromagnetic portion of the electric drive device of this invention includes a stator 22 which is capable of producing a rotating or an alternating magnetic field; a main rotor 26 and an auxiliary rotor 25 that are capable of producing torques at asynchronous speed. Said stator and rotor all have their own respective core; said main rotor 26 has a closed winding, or a conductor equivalent to the winding, 23 for conducting the induced electric current therein. Different parts of the main rotor core 26 are respectively surrounded by the core of the stator 22 and the core of the auxiliary rotor 25, which is neither surrounded by, nor surrounding any portion of the core of the stator 22, hence this electromagnetic portion has two closed magnetic circuits respectively linking with the main rotor winding 23. The first magnetic circuit includes the core of the stator 22 and a part of the core of the main rotor 26, but excludes the core of the auxiliary rotor 25, and links with the stator winding; the second magnetic circuit includes the core of the auxiliary rotor 25 and the other part of the core of the main rotor 26, but excludes the core of the stator 22. After a suitable A.C. power is supplied, the magnetic flux 24 is excited by the stator 22 in the first magnetic circuit, then an electrical current is induced in the winding 23 by the flux 24, and a torque is produced by the main rotor 26. The magnetic flux 27 is also generated in said second magnetic circuit by the current in the winding 23, and thus the auxiliary rotor 25 produces a torque too. The current in the stator winding does not directly excite the main flux through the core of the auxiliary rotor and drive it to rotate.

Said core of the auxiliary rotor 25 may includes a solid block of steel or electrical pure iron.

Figure 3:
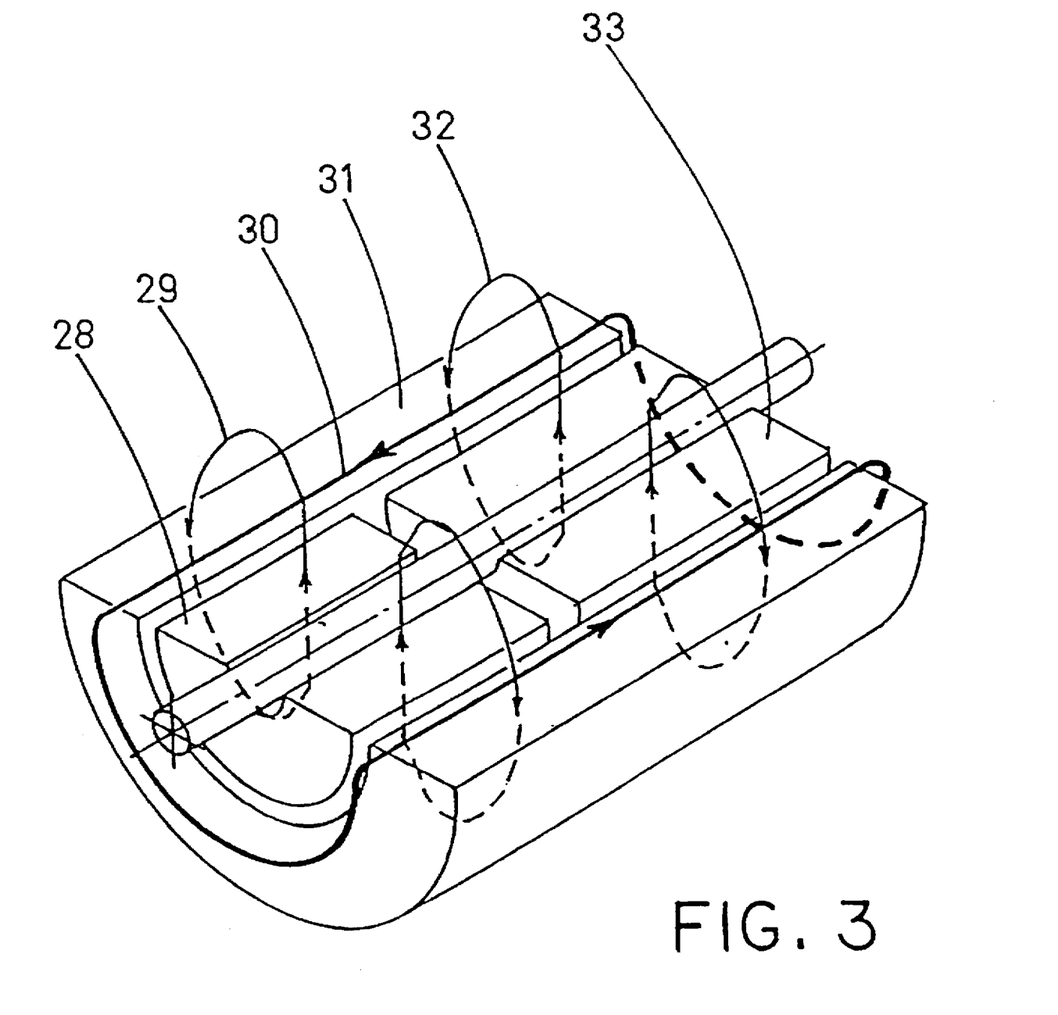

As shown in FIG. 3, another type of the electromagnetic portion of the electric drive device of this invention includes a stator 31 capable of producing a rotating or an alternating magnetic field; a main rotor 28 and an auxiliary rotor 33 capable of producing torque at asynchronous speed. Said stator 31 has a winding 30 and a core. Each said rotor also has its own core. Rotor 28 and 33 are surrounded by different parts of the core of said stator 31 respectively. So, this electromagnetic portion has two closed magnetic circuits linking with the stator winding respectively. The first one of said magnetic circuits includes the core of the main rotor 28 and a part of the core of the stator 31; the second magnetic circuit includes the core of the auxiliary rotor 33 and the other part of the core of the stator 31. After a suitable A.C. power is supplied, the magnetic flux 29 and 32 in these two magnetic circuits are respectively excited by the current in said stator winding 30. Affected by the magnetic flux 29 and 32, said rotors 28 and 33 can produce driving torque.

The transmission portion of the electric drive device provided in this invention may have many types of structures.

Figure 4:
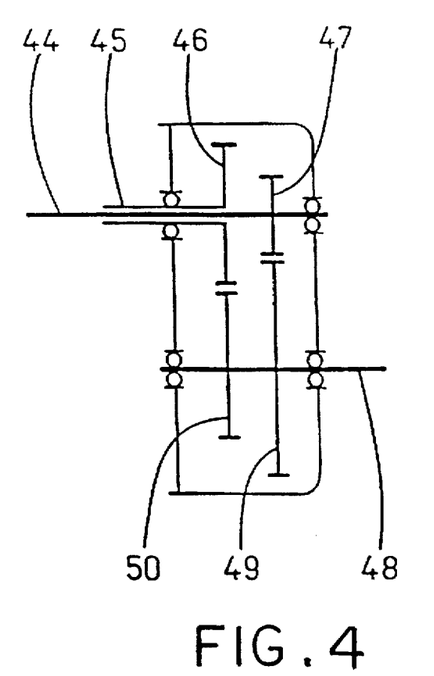
FIGS. 4–7 are axial sectional schematic diagrams of the transmission portions in the electric drive devices of this invention.

As shown in FIG. 4, a type of transmission portion of the electric drive device of this invention includes gears 46,47, 49,50 and transmission shafts 44,45,48. The transmission shaft 45 is hollow and rotatably mounted on the transmission shaft 44. Gears 46 and 47 are connected to the transmission shafts 45 and 44 respectively. Gears 49 and 50 are both connected to the transmission shaft 48. Gears 46 and 47 are respectively meshed with the gears 50 and 49. So, there are fixed speed ratios between each of the transmission shafts 44,45 and the shaft 48.

Figure 5:
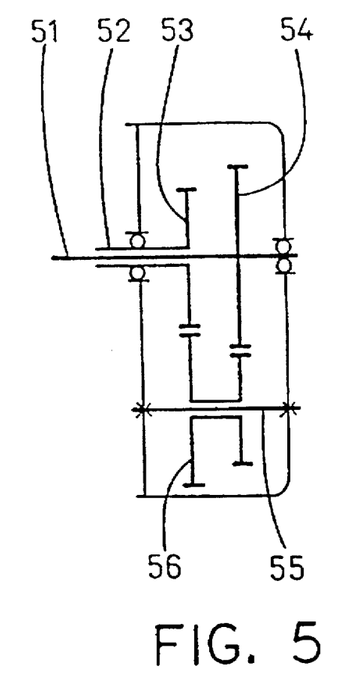

As shown in FIG. 5, another type of transmission portion of the electric drive device of this invention includes gears 53 and 54 called as the first gear and second gear, respectively; a duplex gear 56; transmission shafts 51 and 52 called as the first and second shaft respectively; and a fixed central spindle 55. The transmission shaft 52 is hollow and rotatablely mounted on the shaft 51. Gears 53 and 54 are connected with transmission shafts 52 and 51, respectively. The duplex gear 56 is rotatably mounted on the spindle 55, its two gear rings are respectively meshed with gears 53 and 54. So, between shafts 51 and 52, there is a fixed speed ratio.

Figure 6:
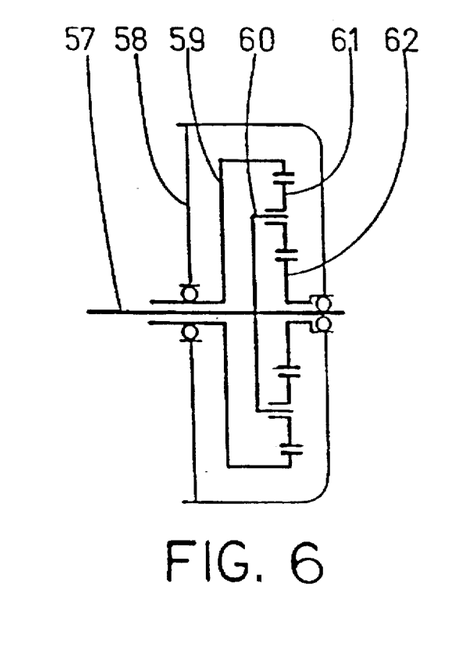

As shown in FIG. 6, another type of transmission portion of the electric drive device of this invention includes a transmission shaft 57, an inner gear 59, a planetary frame 60, a planet gear 61 and a central gear 62. The inner gear 59 is rotatably mounted on the transmission shaft 57, the planetary frame 60 is connected with the transmission shaft 57, the planet gear 61 is rotatably mounted on the planetary frame 60 and meshing with the central gear 62 and the inner gear 59 simultaneously; the central gear 62 is connected with the frame 58. In doing so, the inner gear 62 has a fixed speed ratio greater than 1 relative to the transmission shaft 57.

Figure 7:
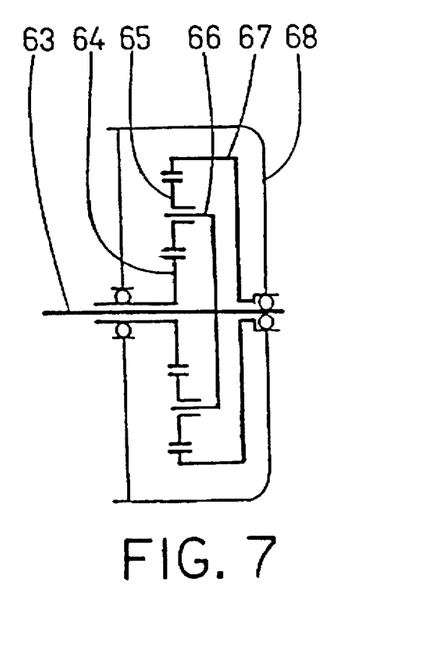

As shown in FIG. 7, another type of transmission portion of the electric drive device of this invention includes a transmission shaft 63, a central gear 64, a planet gear 65, a planetary frame 66 and an inner gear 67. The central gear 64 is rotatably mounted on the transmission shaft 63; the planetary frame 66 is connected with the shaft 63, the planetary gear 65 is rotatably mounted on the planetary frame 66 and meshing with the central gear 64 and the inner gear 67; the inner gear 67 is connected with the frame 68. In doing so, the central gear 64 has a fixed speed ratio greater than 1 (one) relative to the transmission shaft 63.

The electric drive device in this invention may include any type of the above mentioned electromagnetic portions and also any type of the above mentioned transmission portions.

Figure 8:
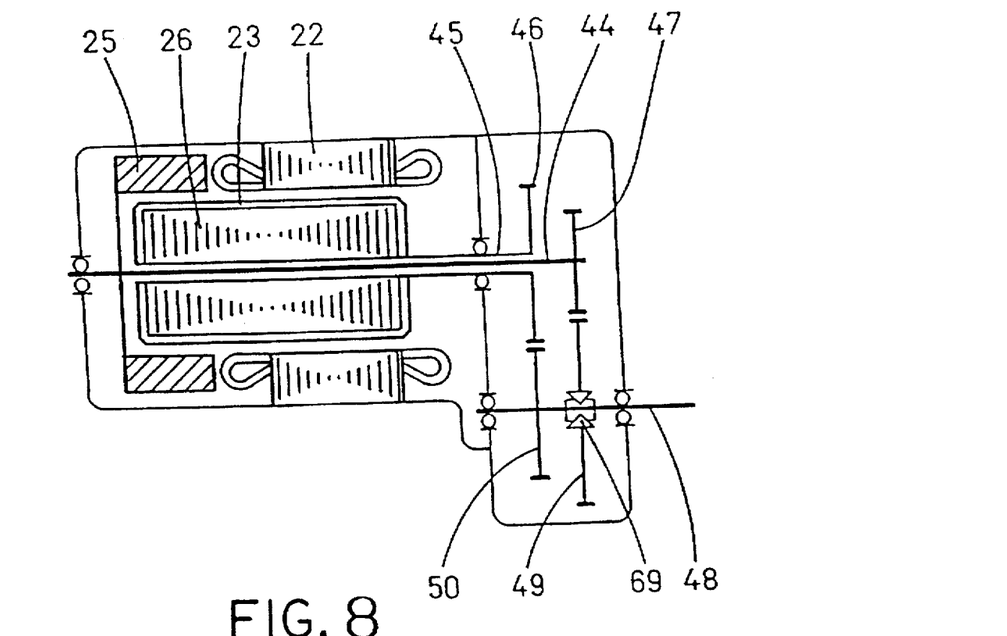
FIGS. 8–11 are axial sectional schematic diagrams of four types of the electric drive device of this invention including the electromagnetic portion shown in FIG. 2 and the transmission portions respectively shown in FIGS. 4–7.

FIG. 8 shows a type of the electric drive device in this invention. Said device includes an electromagnetic portion as shown in FIG. 2 and a transmission portion as shown in FIG. 4. The transmission shafts 45 and 44 in said transmission portion are connected with the main rotor 26 and the auxiliary rotor 25 in said electromagnetic portion, respectively. Thus, shaft 48 as an output element can be driven by both two said rotors. The speed ratio of main rotor 26 relative to the shaft 48 is less than that of the auxiliary rotor 25 relative to the same.

A type of said electric drive device has a one-way clutch 69 used as its automatic unloading device. The gear 49 in said transmission portion is connected with the shaft 48 by said one-way clutch 69. The one-way clutch 69 can be released when the auxiliary rotor 25 is fixed and the main rotor 26 is rotating in its predetermined positive direction. While said electric drive device is speeding up, after the speed of the auxiliary rotor 25 is near, or equal to, the synchronous speed, and the main rotor 26 is accelerating further in its positive direction, the one-way clutch 69 will automatically be released, the auxiliary rotor 25 will float freely for not bearing the load on the output shaft 48 again.

In order to make the auxiliary rotor 25 floating freely after it is accelerated up to near the synchronous speed, said one-way clutch 69 may be mounted between any two connected transmission elements in the transmission chain from the auxiliary rotor 25 to the transmission shaft 48 which is the output element. For example, said one-way clutch can be used for connecting the shaft 44 and the gear 47 or connecting the auxiliary rotor 25 and the shaft 44.

Figure 9:
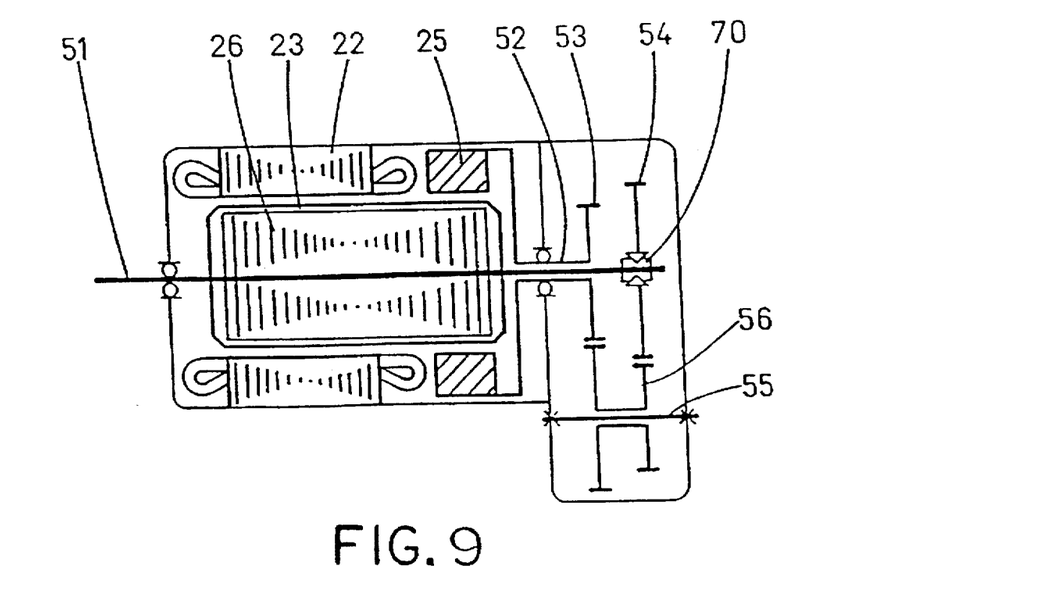

FIG. 9 shows another type of the electric drive device of this invention, including the electromagnetic portion shown in FIG. 2 and the transmission portion shown in FIG. 5. The transmission shafts 51 and 52 in said transmission portion are respectively connected with the main rotor 26 and the auxiliary rotor 25 in the electromagnetic portion. The transmission shaft 51 can be used as an output element for said electric drive device. Correspondingly, the speed ratio of the auxiliary rotor 25 driving the shaft 51 through said transmission portion should be greater than 1 (one).

A type of said electric drive device has a one-way clutch 70 used as its automatic unloading device. The gear 54 of said transmission portion is connected with the shaft 51 by said one-way clutch 70. This one-way clutch can be released when the auxiliary rotor 25 is fixed and the main rotor 26 is rotating in its predetermined positive direction. Thereby, the auxiliary rotor 25 can change into its floating state after having a speed near or equal to the synchronous speed during the speeding up period of said electric drive device.

Figure 10:
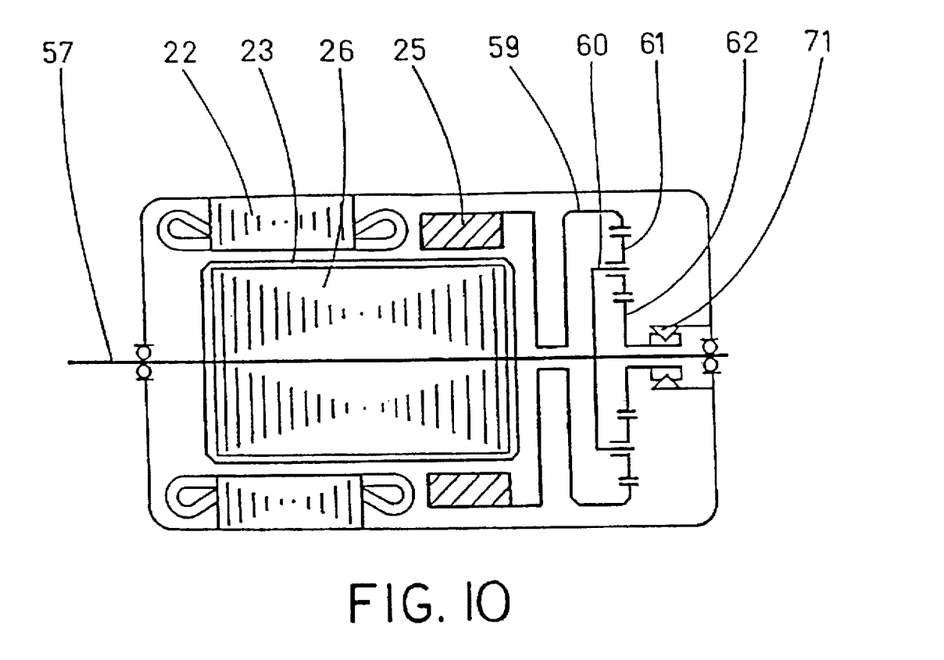

FIG. 10 shows a type of the electric drive device of this invention, including the electromagnetic portion shown in FIG. 2 and the transmission portion shown in FIG. 6. The transmission shaft 57 and the inner gear 59 in said transmission portion are connected with the main rotor 26 and the auxiliary rotor 25 in said electromagnetic portion, respectively. The transmission shaft 57 can be used as an output element of said electric drive device.

A type of said electric drive device has a one-way clutch 71 used as its automatic unloading device. A central gear 62 in said transmission portion is connected with the frame by this one-way clutch. Said one-way clutch 71 can be released when the auxiliary rotor 25 is fixed and the main rotor 26 rotating in its predetermined positive direction. So, with said electric drive device speeding up, after the auxiliary rotor 25 reaches the synchronous speed, the one-way clutch 71 will be automatically released and the auxiliary rotor 25 will change into its floating state.

Figure 11:
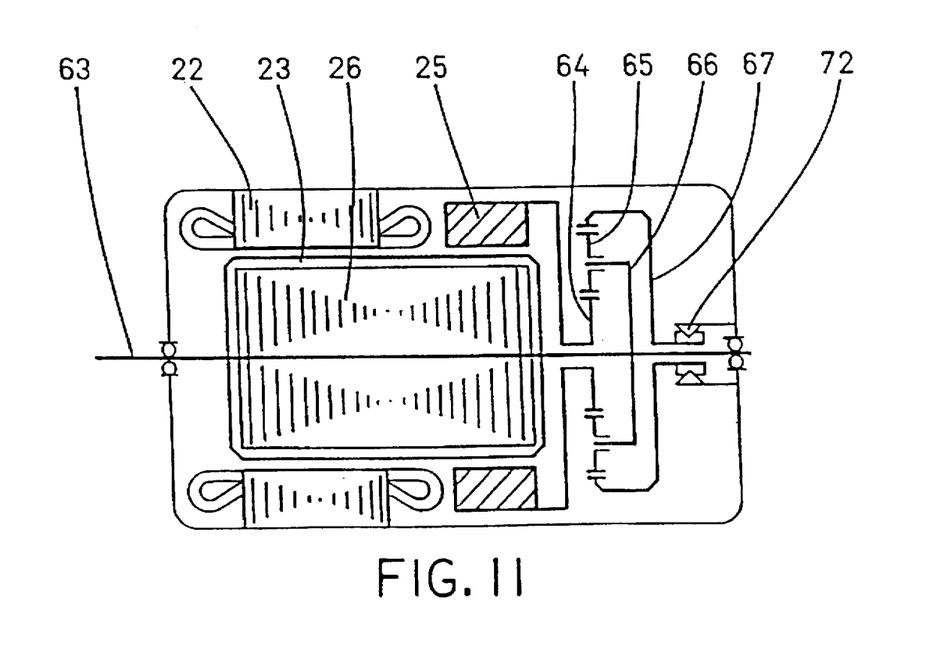

FIG. 11 shows another type of the electric drive device in this invention, including the electromagnetic portion shown in FIG. 2 and the transmission portion shown in FIG. 7. The transmission shaft 63 and the central gear 64 in said transmission portion are respectively coupled with the main rotor 26 and the auxiliary rotor 25 in said electromagnetic portion. The shaft 63 may be used as an output element of said electric drive device.

A type of said electric drive device has a one-way clutch 72 used as the automatic unloading device. Said inner gear 67 is connected with the frame by the one-way clutch 72. The one-way clutch 72 can be automatically released when the auxiliary rotor 25 is fixed and the main rotor 26 rotating in its positive direction. So, while the said drive device is speeding up, the auxiliary rotor 25 will shift to its floating state after its speed is near or equal to the synchronous speed.

Figure 12:
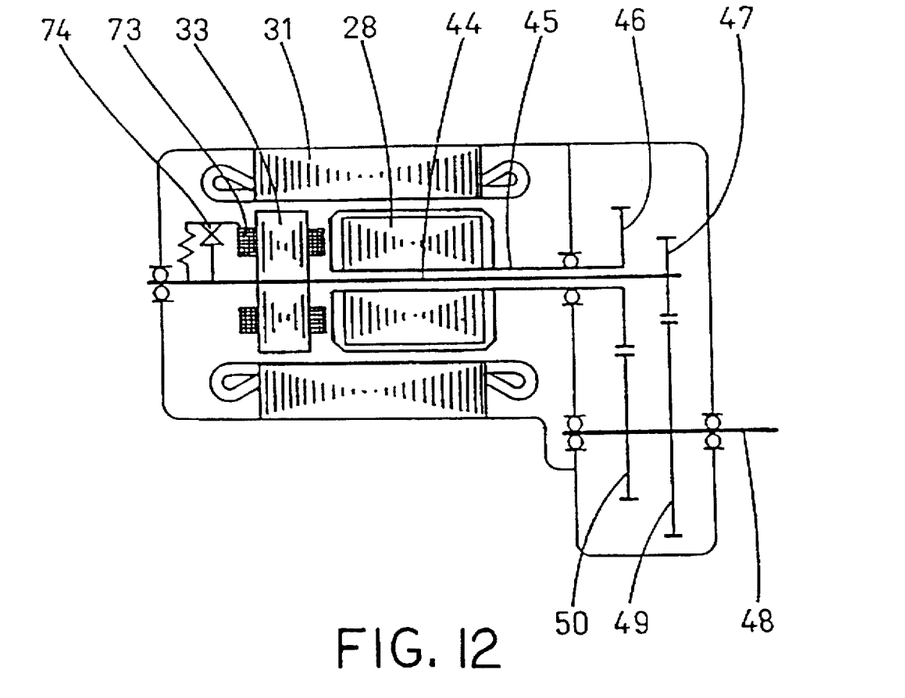
FIG. 12 is an axial sectional schematic diagram of another type of the electric drive device of this invention including the electromagnetic portion shown in FIG. 3 and the transmission portion shown in FIG. 4.
Figure 13:
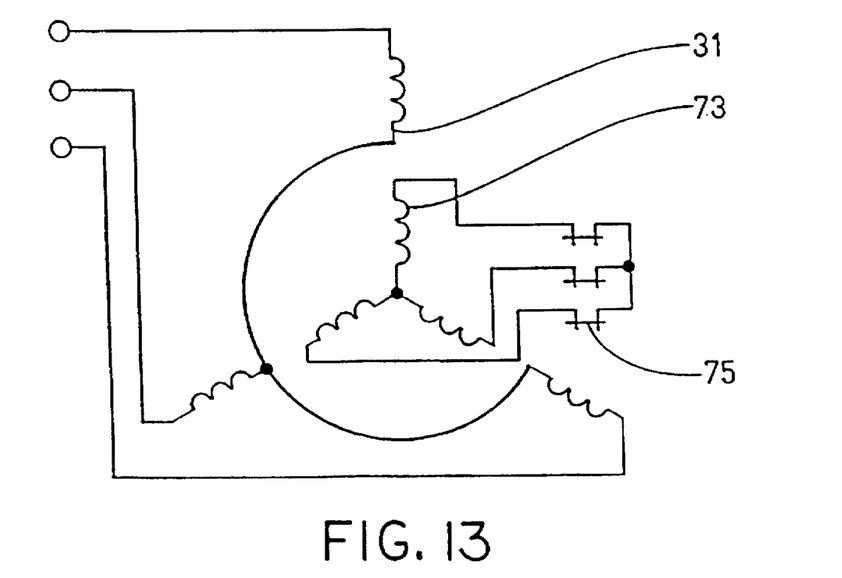
FIG. 13 is the electrical circuit diagram of the electric drive device shown in FIG. 12.

As shown in FIGS. 12 and 13, a type of the electric drive device of this invention includes the electromagnetic portion shown in FIG. 3 and the transmission portion shown in FIG. 4. The shafts 45 and 44 in said transmission portion are respectively connected with the rotors 28 and 33 in said electric potion. Thus, these two rotors can drive the shaft 48 which is the output element. In FIG. 12, said rotor 28 is the main rotor and said rotor 33 is the auxiliary rotor. The speed ratio of the main rotor 28 relative to the shaft 48 is less than that of the rotor 33 relative to the same.

A type of said electric drive device has an automatic unloading device. Its auxiliary rotor 33 has a wire wound winding 73. Said automatic unloading device includes a set of automatic switch device 74 having several pair of normally closed contacts controlled by the rotational speed of a transmission element, such as the well known centrifugal switch or relay. As shown in FIG. 13, the closed circuit of every phase of said auxiliary rotor winding has at least one pair of said normally closed contact connected in series. While said electric drive device is speeding up, when the speed of the auxiliary rotor, i.e., the speed of the shaft 44, reaches the predetermined speed that is usually near to the synchronous speed, each pair of the normally closed contact 75 of said switch device will open. So, the induced current of every phase in winding 73 will be cut off, and no electromagnetic moment can be produced by the auxiliary rotor further. Thus, the auxiliary rotor will not be able to exert influence on the output of said electric drive device further.

Figure 14:
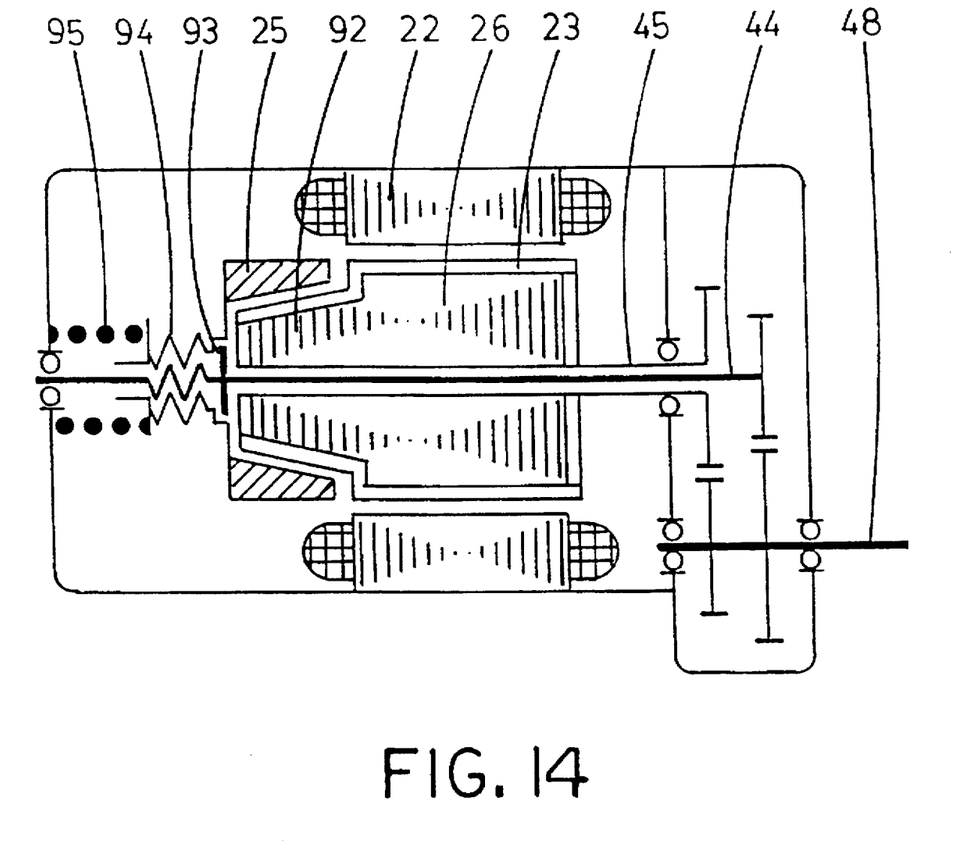
FIG. 14 is an axial sectional schematic diagram showing an embodiment of the electric drive device of this invention including the electromagnetic portion shown in FIG. 2 and the transmission portion shown in FIG. 4.

FIG. 14 shows a type of electric drive device of this invention having the electromagnetic portion shown in FIG. 2 and the transmission portion shown in FIG. 4.

Said transmission shaft 44 has a protrusion step 93 and a spiral thread. Correspondingly, said auxiliary rotor 25 has a spiral thread and a protrusion step matching with that of the shaft 44. If the spiral thread pair 94 consisting of the threads of the shaft 44 and the rotor 25 is screwed up, the protrusion steps of said both members will be pressed to each other closely. The rotor 25, then, will be coupled with the shaft 44 and hence can drive said output shaft 48. If said spiral thread pair 94 is screwed off, said auxiliary rotor 25 can then rotate freely. Said main rotor 26 is connected with said transmission shaft 45. The speed ratio of said main rotor 26 driving the shaft 48 is less than that of the auxiliary rotor 25 driving the same.

The direction of said spiral thread pair 94 is set in a manner such that, if the transmission shaft 44 is fixed and the auxiliary rotor is rotating in its predetermined positive direction, this spiral thread pair will be screwed up, then, the pair of protrusion steps 93 will also be pressed closely together.

In this way, during accelerating period of said electric drive device, when the speed of the auxiliary rotor is less than the synchronous speed, said spiral thread pair will be screwed up, hence said main rotor and said auxiliary rotor will simultaneously speed drive the output shaft. After the speed of said auxiliary rotor is near to the synchronous speed, it will not be accelerated further and the speed of the shaft 44 will exceed that of said rotor. Thus said spiral thread pair will be screwed off and the auxiliary rotor will then change into its floating state.

In order to have the spiral thread pair 94 able to be automatically screwed up again from its separated state during the decelerating period of said electric drive device, it is required that an appropriate force acting on the auxiliary rotor, and directing along the same direction as that of the axial displacement of this rotor which occurred when the spiral thread pair being screwed on.

For this purpose, a type of said electric drive device is provided with a spring 95. When said spiral thread pair screwed off, said spring is forced deforming and, thereby produces a force acting on the auxiliary rotor 25 and directing along the same direction as that of the axial displacement of the auxiliary rotor occurred while said spiral thread pair 94 being screwed on.

In another type of said electric drive device, the core of the main rotor has a truncated circular conical portion 92 surrounded by the core of the auxiliary rotor. When said spiral thread pair 94 screwed up, the air gap between the truncated circular conic portion 92 of the main rotor and the auxiliary rotor 25 is reducing due to the axial displacement of the later. During the operation of such an electric drive device, the electromagnetic force acting between the truncated circular conical portion 92 of the main rotor and the auxiliary rotor will include the component acting on said auxiliary rotor and directing along its axial displacement occurred while said spiral thread pair being screwed on.

It is evident to realize that, there are many else designs of this invention having combinations of the various aforesaid electromagnetic portions with different aforesaid transmission portions, or having various types of the unloading devices situated on different locations, but other than that illustrated in the aforementioned embodiment. Based on the disclosure of the above description, any design complying with the appended claims can be made by the person skilled in the art in which this invention is involved with.

I claim:

1. An A.C. electric device used for driving a machine, including an electromagnetic portion;

said electromagnetic portion including a stator and at least a main rotor and an auxiliary rotor; said stator having a core for conducting magnetic flux, and a winding capable of generating a rotating or an alternating magnetic field when a suitable A.C. power is supplied; said main and auxiliary rotors also having their own respective cores for conducting magnetic flux, and both said rotors being capable of producing torques at asynchronous speed under the effect of a rotating or an alternating magnetic field;

wherein said main rotor has a closed winding or a conductor equivalent to the closed winding for conducting induced current;

said electromagnetic portion has a first closed magnetic circuit and a second closed magnetic circuit both linked with said winding or said conductor of the main rotor;

the first magnetic circuit links with said winding of the stator, and includes the core of the stator and a part of the core of the main rotor, but not the core of the auxiliary rotor;

the second magnetic circuit includes the other part of the core of the main rotor and at least a part of the core of the auxiliary rotor, but not the core of the stator;

whereby, the current in the winding of the stator can excite in the first magnetic circuit a main flux capable of driving the main rotor to rotate and thereby induce a current in the winding or conductor of said main rotor;

said induced current in the winding or conductor of the main rotor can excite in the second magnetic circuit a main flux capable of driving the auxiliary rotor to rotate; and said main flux excited by the current of said stator winding in said first magnetic circuit does not pass through the core of the auxiliary rotor.

2. An electric drive device claimed in claim 1, wherein said electric drive device further includes a transmission portion and a frame for supporting the transmission portion;

said transmission portion having several transmission elements with fixed speed ratios between each other, including an output transmission element, used for driving the mechanical loads;

said two rotors are respectively connected with one of said transmission elements, so that they can drive said output element with a respective fixed speed ratio; and the speed ratio of said main rotor relative to the output element is less than the speed ratio of said auxiliary rotor relative to the same.

3. An electric drive device claimed in claim 2, further including an automatic unloading device which can automatically free said auxiliary rotor from driving said output element, when said auxiliary rotor is accelerated to have a certain speed while the electric drive device speeding up.

4. An electric drive device claimed in claim 3, characterised in that:

said unloading device includes an automatic switch having at least one normally closed contact;

said auxiliary rotor has one wire wound winding;

said winding has closed circuits for conducting the induced current in every phase;

each said closed circuit has at least one pair of said normally closed contact connected in series;

while the said drive device speeding up, when said auxiliary rotor is accelerated to a certain speed, said normally closed contacts will automatically open, so that said closed circuit of every phase of said rotor winding being cut off.

5. An electric drive device claimed in claim 3, characterised in that:

said automatic unloading device includes a one-way clutch;

a transmission element in said transmission portion is connected to another transmission element or the frame by said one-way clutch;

when said one-way clutch is coupled, said auxiliary rotor can drive said output element with a fixed speed ratio; when said one-way clutch is released, said auxiliary rotor will freely float relative to said output element;

if said auxiliary rotor is fixed and the main rotor is rotating in its predetermined positive direction, said one-way clutch will be released.

\* \* \* \* \*